United States Patent
Stauffer

[15] 3,678,918
[45] July 25, 1972

[54] RECIPROCATING SAW
[72] Inventor: Alfred Stauffer, Steffisburg, Switzerland
[73] Assignee: Maschinenfabrik Meyer & Burger A.G., Bern, Switzerland
[22] Filed: Aug. 10, 1970
[21] Appl. No.: 62,521

[30] Foreign Application Priority Data
Aug. 25, 1969  Switzerland ..................... 12840/69

[52] U.S. Cl. ........................................ 125/16 R, 143/156 A
[51] Int. Cl. ........................................................... B28d 1/02
[58] Field of Search ..................... 125/12, 16, 17; 143/156

[56] References Cited
UNITED STATES PATENTS
3,079,908  3/1963  Hunt ........................................ 125/17
3,362,392  1/1968  Miller ...................................... 125/17

FOREIGN PATENTS OR APPLICATIONS
9,416  0/0000  Germany ................................ 143/156

Primary Examiner—Harold D. Whitehead
Attorney—Imirie and Smiley

[57] ABSTRACT

A reciprocating saw having a holding frame and detachably inserted therein a separate tension frame equipped with sawblades and supported in the holding frame in a fixed position by straightening means. With the machine there are associated preferably at least two tension frames, which at will may be inserted in the machine and prepared apart from the same for later use therein, respectively.

10 Claims, 6 Drawing Figures

Patented July 25, 1972

INVENTOR
ALFRED STAUFFER
BY
Imirie & Smiley
Attys.

Patented July 25, 1972

INVENTOR
ALFRED STAUFFER
BY
Imirie & Smiley
Attys.

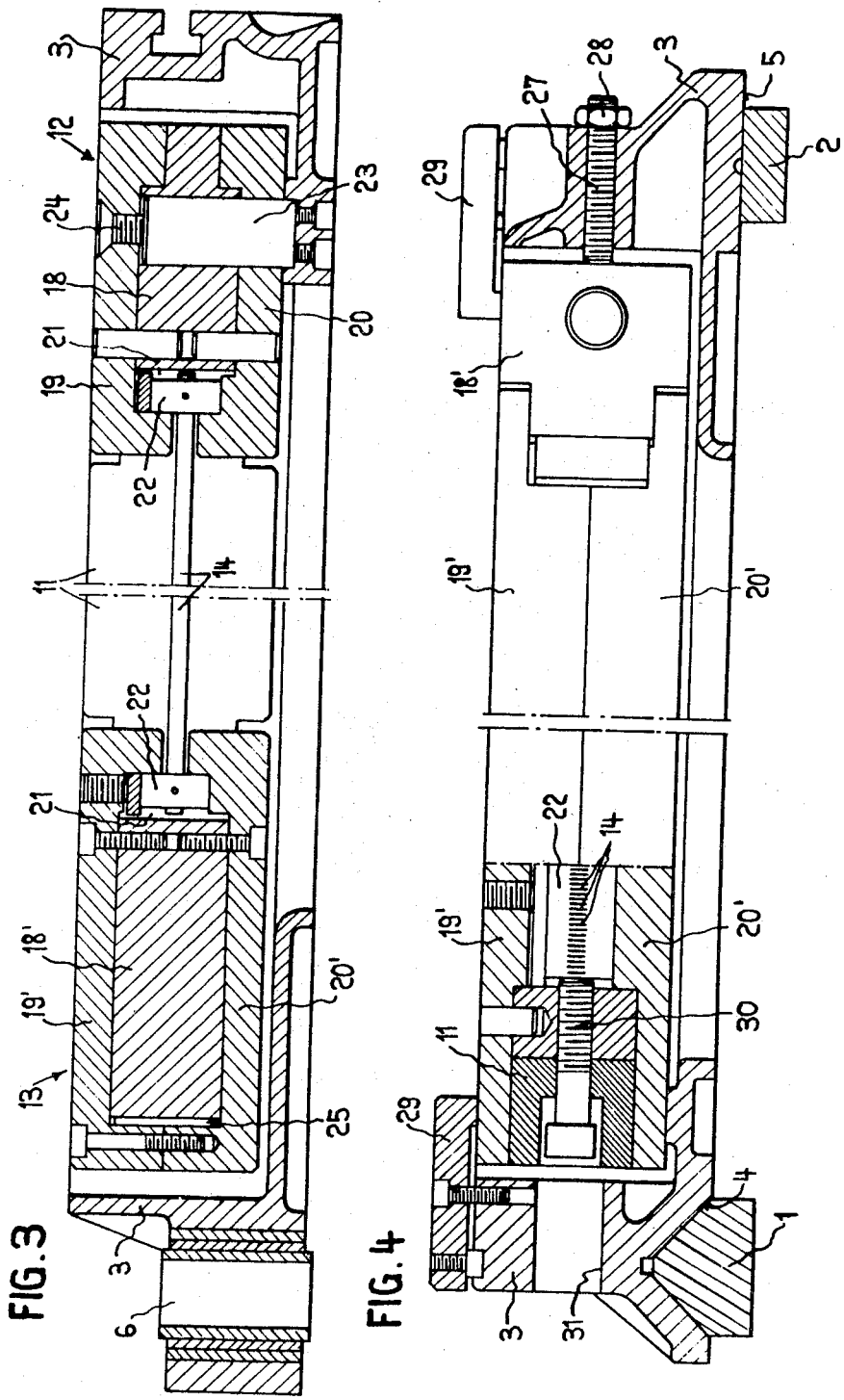

RECIPROCATING SAW

BACKGROUND OF THE INVENTION

The present invention relates to a reciprocating saw having saw-blades fixed between opposite yokes of a frame. Such reciprocating saws serve e.g. for sawing quartz crystals into thin quartz flats for manufacturing oscillator quartzes. For this purpose there must be provided a relatively great number of saw-blades nearly juxtaposed. In order to make the best of the material the saw-blades should be made thin, which on the other hand requires a very constant strong tension if it is intended to obtain exact plane cuts. Therefore, the frame must generate and receive, respectively, tensions of totally many tons, which involves some difficulties in known reciprocating saws.

In known reciprocating saws there is provided only a single frame movable to and fro within guides and simultaneously serving for stretching the saw-blades. Therefore, it is necessary to supply the frame with stretching means permitting tHe generation of tension forces in the range of many tons. These tension forces must be generated by bolts or the like when the frame is within the machine; that is complicated and time-consuming. The replacement of a worn out saw-blade set by new one and the stretching of new saw-blade sets also take place when the frame remains within the machine. Due to the very high tension forces the frame is minimally deformated, which involves difficulties in the guidance and at least inaccuracy. In particular, it is impossible to adjust the saw-blades exactly parallel to the direction of movement of the frame being distorted and inexactly guided in case, which, however, is absolutely necessary for an accurate and exact machining.

SUMMARY OF THE INVENTION

It is an object of the present invention to eliminate the above mentioned disadvantages of known machines.

The reciprocating saw according to the invention is characterized in that a separate tension frame bearing the saw-blades is detachably inserted with lateral clearance in a holding frame movable to and fro along guides and is supported in the holding frame in a fixed position by straightening means.

The use of a separate tension frame detachably inserted in a guiding frame of the reciprocating saw renders it possible to insert sets of sawing-blades in the tension frame removed from the machine; thereby this manipulation is considerably facilitated by the possibility of using suitable auxiliary implements. First of all it is possible to provide at least two tension frames for each one machine, so that always one tension frame already equipped with saw-blades may be kept on hand and after attrition of a set of saw-blades may be inserted in the holding frames within a very short time. Thus, the time necessary for setting the reciprocating saw may be shortened considerably.

Since the tension forces ar received exclusively by the tension frame practically no forces and deformations take effect in the actual holding frame serving also for guidance. Thus, a sure guidance is guaranteed. Finally, it is very simple in the holding frame to set right accurately the tension frame bearing the saw-blades and thereby to adjust exactly the saw-blades parallel to the direction of movement.

BRIEF DESCRIPTION OF THE DRAWINGS

Hereafter the invention is illustrated more detailed by way of an embodiment shown in the drawings, wherein:

FIG. 3 is a sectional view taken on the line III—III of FIG. 2, FIG. 4 is a sectional view taken on the line IV—IV of FIG. 2.

DESCRIPTION OF THE PREFERRED EMBODIMENTS

Figure 1:
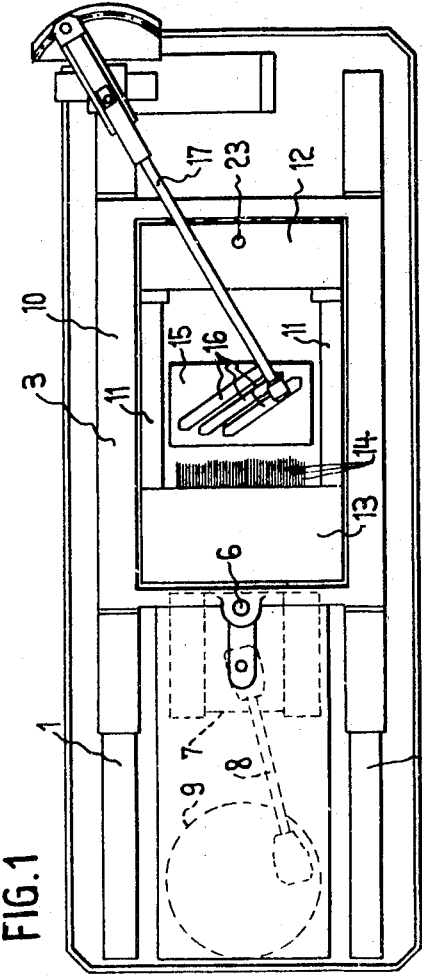
FIG. 1 is a plan view of the reciprocating saw.

The reciprocating saw schematically shown in FIG. 1 in total plan view has two parallel longitudinal guides 1 and 2, along which a holding frame 3 is movable. As FIG. 4 shows, the holding frame 3 has a prismatic guide 4 and an even guide surface 5. By means of a bolt 6 the holding frame 3 is pivotally connected to a driving chariot 7 which is movable to and fro in parallel with the longitudinal guides 1 and 2 by means of a crank drive 8, 9. The driving chariot 7 has the aim to avoid the transmission of transverse components of the driving power of the crank drive directly to the holding frame 3 and thus to avoid any lateral load of this frame.

In a manner later to be described in the holding frame 3 there is inserted a tension frame 10 consisting of two lateral pressure legs 11 and a yoke 12 and 13, respectively, at a time. Between the yokes 12 and 13 there are fixed the saw-blades 14 shown in FIG. 1 only partially. Beneath the saw-blades there is provided a table 15 movable up and down hydraulically and on which according to the shown embodiment three quartz crystals 16 are clamped in order to be sawn into flats. A swinging pipe 17 serves for the feed of grinding materials to the saw-blades and the quartz crystals 16, respectively.

Figure 2:
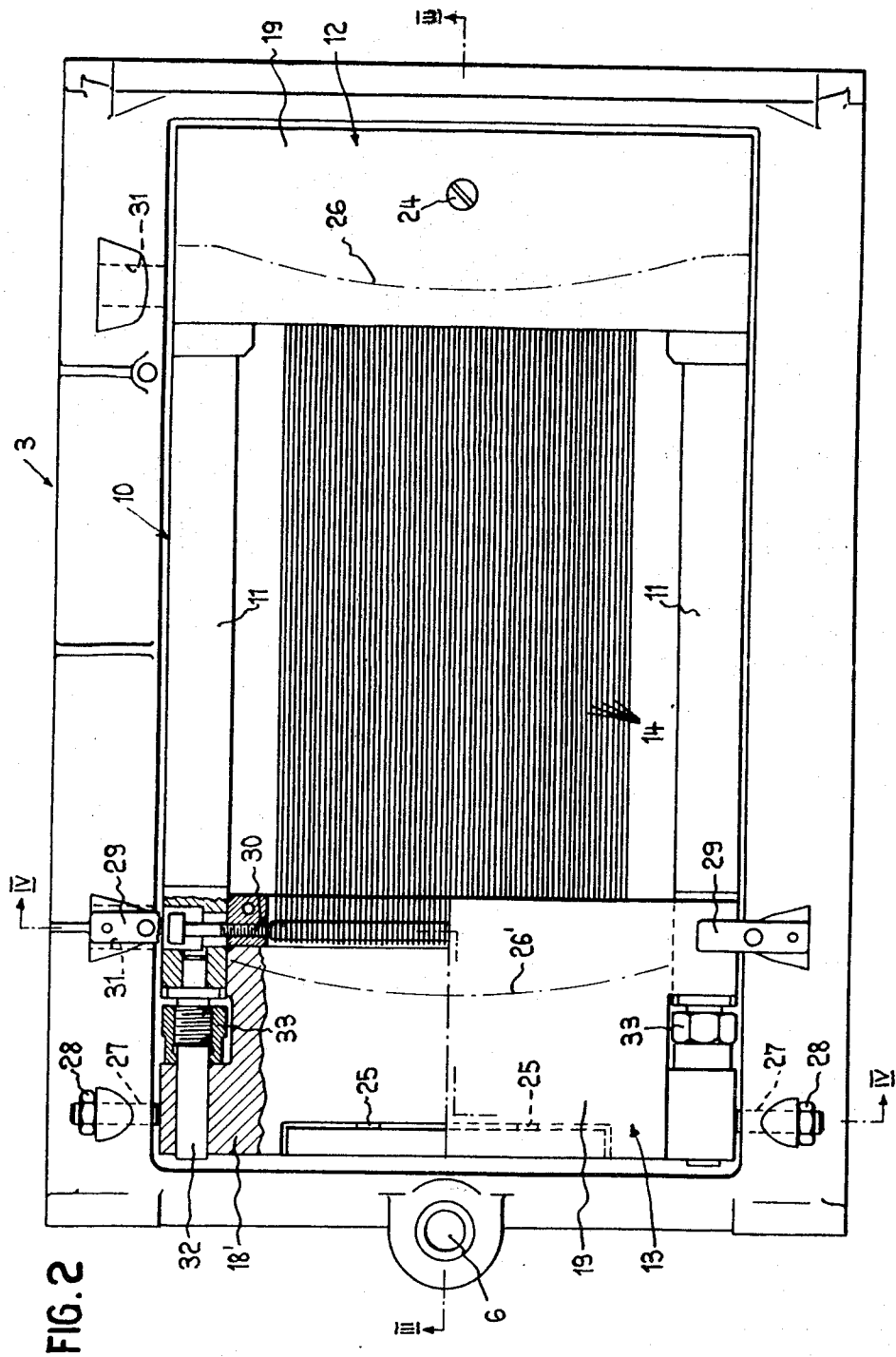
FIG. 2 is a plan view of the holding frame and the tension frame inserted therein, partially in section and on a larger scale.

FIGS. 2, 3, and 4 show further details of the construction of holding frame 3 and tension frame 10. The yoke 12 of the tension frame is built up of a yoke bar 18 and two holding profiles surrounding the same. The outer legs of the holding profiles 19 and 20 grasp behind shoulders of the bar 18 free from play, whilst on the inside between the bar and the inwards projecting legs of the holding profiles 19 and 20 a cavity 21 remains. Into this cavity the saw-blades 14 project and there they are fixed by means of holding flats 22 which simultaneously serve for holding fixed the saw-blades to the holding profiles 19 and 20 and for fixing the distance between adjacent saw-blades. A swivelling pivot 23 bolted with the holding frame 3 serves for suspension of the yoke 12 of the tension frame in the holding frame 3, whereby the yoke 12 is secured to the pivot 23 by means of a screw 24. The opposite yoke 13 of the tension frame is built up in a similar manner as the yoke 12, i.e. it consists also of a yoke bar 18' and two holding profiles 19' and 20' having U-shaped cross-section. The saw-blades 14 are fastened here also on the inner legs of the holding profiles 19' and 20' by means of flats 22. But whilst the bar 18 and the profiles 19 and 20 of the yoke 12 are formed as a uniform static system since the outer legs of the holding profiles 19 and 20 border on the bar 18 free from play over their entire length, the outer legs of the holding profiles 19' and 20' lie without the bar 18' with some play and are supported by two distance plates 25 arranged symmetrically to the longitudinal axis of the tension frame and the sectional plane III—III in FIG. 2, respectively, as indicated in FIG. 2 for the one side. This constructive difference entails that due to the tension of the saw-blades 14 the yoke 12 approximately bends according to the line 26 shown in FIG. 2. The holding profiles 19' and 20' of the yoke 13, which are supported only at the points 25 will approximately bend according to the line 26' in FIG. 2 due to the tension of the saw-blades 14. Therefore, the deflections effected in the same sense compensate each other extensively and guarantee a constant tension of all of the saw-blades for the whole width of the set of the saw-blades.

On the side of the yoke 13 in the holding frame 3 straightening screws 27 are provided which may be adjusted and screwed towards the lateral outer surfaces of the yoke bar 18' when the adjusting nut 28 is untied. Therefore, the yoke bar 18' is fixed in a predetermined position between the straightening screws 27 tightened during the operation state, wherewith the whole tension frame is also secured in a predetermined position within the holding frame 3. Upon adjustment of the screws 27 for exactly straightening the saw-blades 14 parallel to the direction of movement of the frame 3 the tension frame 10 easily may be swivelled about the pivot 23. In vertical direction the tension frame is secured within the holding frame 3 on the one hand by the screw 24 and on the other hand by safety hoops 29.

The staples of saw-blades 14 and holding flats 22, respectively, are pressed together and secured by fixing screws 30 accessible from the sides. These fixing screws are accessible through holes 31 of the holding frame 3 even if the tension frame is inserted as indicated in FIGS. 2 and 4.

For stretching the saw-blades 14 between the two yokes 12 and 13 the yoke 13 is movably arranged with respect to the legs 11. For this purpose guiding bolts 32 are inserted in the ends of the legs 11, adjacent to the yoke 13, said guiding bolts traversing holes of the yoke bar 18' and therewith guiding this yoke bar parallel to the longitudinal direction of the legs 11. In the free part arranged between a leg 11 and an outer continuation of the yoke bar 18' at a time the bolts 32 are provided with a thread on which a safety nut is set up. This nut borders on the shoulder of a joining piece of the yoke bar 18' at a time and defines therewith the position of this bar and of the whole yoke, respectively, relative to the other parts of the tension frame. Thus, the tension of the saw-blades is transmitted through the yoke 13, the safety nuts 33, and the bolts 32 to the legs 11 fixed to the yoke 12.

Figure 6:
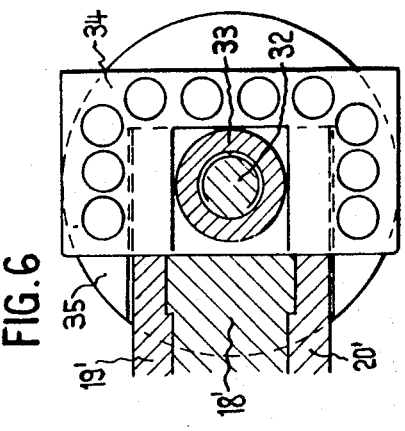
FIG. 6 is a sectional view taken on the line VI—VI of FIG. 5.
Figure 5:
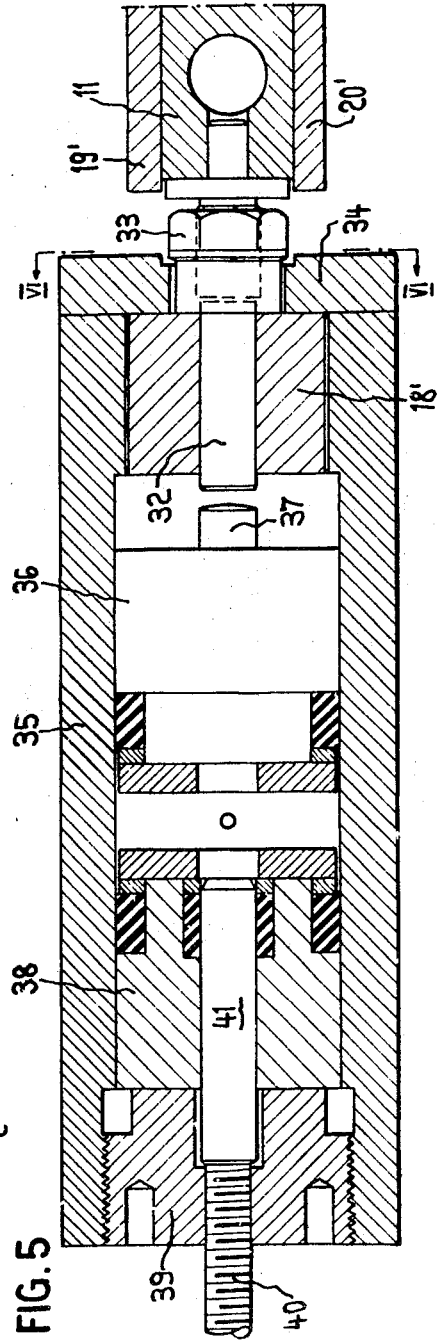
FIG. 5 shows a longitudinal section of a hydraulic tension cylinder.

As shown in FIG. 5, in the region of the bolts 32 the yoke bar 18' has a substantially greater height than the safety nut 33, so that according to FIG. 6 the U-shaped tension plate 34 of each cylinder body 35 may be inserted onto the shoulder of the outer joining piece of the yoke bar 18' over the safety nut 33. The plate 34 is in connection with the actual cylinder body 35 by a cylindrical part having rectangular hole milled in accordance with the shape of the yoke. Within the cylinder body there is arranged the actual tension piston 36 having a pin-like joining piece 37 extending practically coaxially to the bolt 32 when the tension cylinder is set on. Opposite to the tension piston 36 there lies a pressure piston 38 displaceable by means of a screw 39 and a handle mountable thereto. The screw 39 is screwed with a further screw 40 acting to an auxiliary piston 41 having a substantially smaller area than the pressure piston 38.

For stretching the saw-blades according to FIG. 5 two cylinder bodies are set on the two ends of the yoke bar 18. The large area pressure piston 38 is moved now into the cylinder space by means of the screw 39, whereby the screw 40 turns along with and the auxiliary piston 41 runs before with the same velocity. Therewith the tension piston 36 is moved forward with about the same velocity and pressed against the bolt 32 by the pin-like joining piece 37. By further tightening the screw 39 in the cylinder space a certain pressure and therewith a certain tension force may be created. Thus, the clearances existing at first during the movement may be compensated by a rather quick movement of the tension piston 36. The final stretching is effected now by turning the screw 40 within the screw 39 and by driving the small auxiliary piston 41, respectively, whereby the pressure within the cylinder space may be considerably increased again in order to attain the final pressure and therewith the final tension in the saw-blades. As soon as the pressure is attained in both the cylinders, which may be indicated by manometers, the safety nuts 33 are screwed in as to snugly fitting the shoulders of the outer joining pieces of the yoke bar 18', so that after releasing and removing the tension cylinders the tension is maintained. This stretching is naturally effected when the tension frame 10 is removed from the frame 3, whereby preferably at least two tension frames are associated with a machine, which tension frames at will may be inserted in the machine and prepared apart from the same for later use therein, respectively.

Therewith the handling and function of the described reciprocating saw is extensively explained. After preparation of the machine, i.e. after piling up works 16 on the table 15 and setting in a tension frame provided with saw-blades the crank drive 8, 9 is started and moves the frames 3 and 10 with the saw-blades to and fro above the table 15. Then the table is lifted hydraulically upon a fixed pressure, so that the works 16 are laid against the saw-blades from underneath upon a fixed pressure. Then simultaneously grinding material is supplied through the pipe 17. When the machining is finished the frame 3 with the frame 10 may be decoupled from the driving chariot 7 and moved completely to the left in FIG. 1, so that the table 15 becomes accessible for replacing the works.

When the saw-blades are worn out the tension frame is removed by simple releasing the screws 24, 27 and the safety hoops 29. Then a new prepared tension frame having a set of saw-blades may be inserted, straightened by means of the screws 27, and then secured by means of the screw 24 and the hoops 29.

What we claim is:

1. A reciprocating saw comprising in combination:
   guide means;
   a holding frame mounted on said guide means for linear reciprocating movement;
   a drive chariot hinged to said holding frame;
   a set of saw blades and a saw-blade tension frame for carrying said saw blades, said saw-blades frame being removably mounted in said holding frame with lateral clearance between said saw-blade and holding frames;
   adjusting means for bringing said saw-blade frame in exact alignment with the direction of linear movement of said holding frame;
   said saw-blade frame being adapted for engagement with a frame tension unit when said frame is separated from said holding frame whereby to span said saw-blades when said saw-blade frame is so removed.

2. A reciprocating saw according to claim 1, wherein the holding profiles of the one yoke and the outer legs of said profiles border on the yoke bar free from play over their entire length, while the holding profiles of the other yoke are supported spaced from the associated yoke bar in such a manner that the holding profiles of both the yokes may undergo bending compensating each other by the tension effect of the saw-blades.

3. A reciprocating saw according to claim 1, wherein the one yoke of the tension frame is pivotally connected to the legs of the tension frame in the direction of the tension and in stretched position supported by an adjustable supporting means.

4. A reciprocating saw according to claim 3, including in combination is provided a hydraulic tension unit, by means of which the tension frame is stretchable.

5. A reciprocating saw according to claim 4, wherein the tension unit includes two cylinders, each of which is placeable between the one yoke end of the tension frame and the adjacent leg of the tension frame.

6. A reciprocating saw according to claim 4 wherein one yoke of said tension frame is slidingly guided on bolts inserted in the ends of the legs of said tension frame, an adjusting nut being arranged on a threaded portion of each of said bolts, said portion lying between the yoke end and the adjacent leg of said tension frame, said bolts projecting from the ends of said yoke, and the yoke adjacent said bolt having a shoulder formed thereon, and wherein said tension unit comprises a cylinder body having means engageable with said shoulder portion of said yoke and with the exposed end of said bolts for applying oppositely directed forces between said bolt end and said shoulder for tensioning said saw-blades, the relative spacing of said bolt ends and said shoulder being maintained by adjusting said nuts to thereby fix the said tension at a desired level.

7. A reciprocating saw according to claim 6, wherein the adjusting nut borders on the shoulder, on which the cylinder is placeable.

8. A reciprocating saw according to claim 7, wherein each of the cylinders has a pressure piston screwable by hand, said piston being screwed with a smaller pressure piston, whereby the final pressure and the final tension, respectively, is attainable by actuating the smaller pressure piston.

9. A reciprocating saw according to claim 1 wherein said tension frame is pivotally supported at one end thereof in the holding frame, and wherein adjusting screws bear against the lateral edges of said frame toward the opposite end thereof to fix the position of the said tension frame within said holding frame.

10. A reciprocating saw according to claim 1 wherein said saw-blade frame comprises a pair of opposed yokes, each yoke having removably screwed U-shaped holding profiles enclosing a yoke bar with the legs of said U-profiles extending forward of the said bar and projecting toward each other to define flats bordering on the inner surfaces of the said legs, whereby said sawing blades extending between said yokes may be fastened on said flats.

* * * * *